Figure 4:
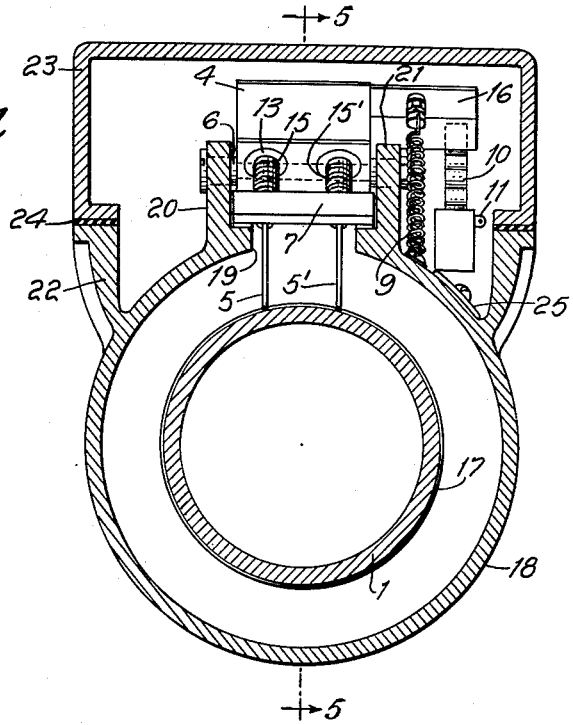

Nov. 15, 1955 E. MANTEUFFEL 2,723,810
FACILITY FOR TRACING THE ROUTING-ADJUSTMENT
RINGS ON PNEUMATIC-TUBE DISPATCH CARRIERS
Filed July 31, 1952 2 Sheets-Sheet 1
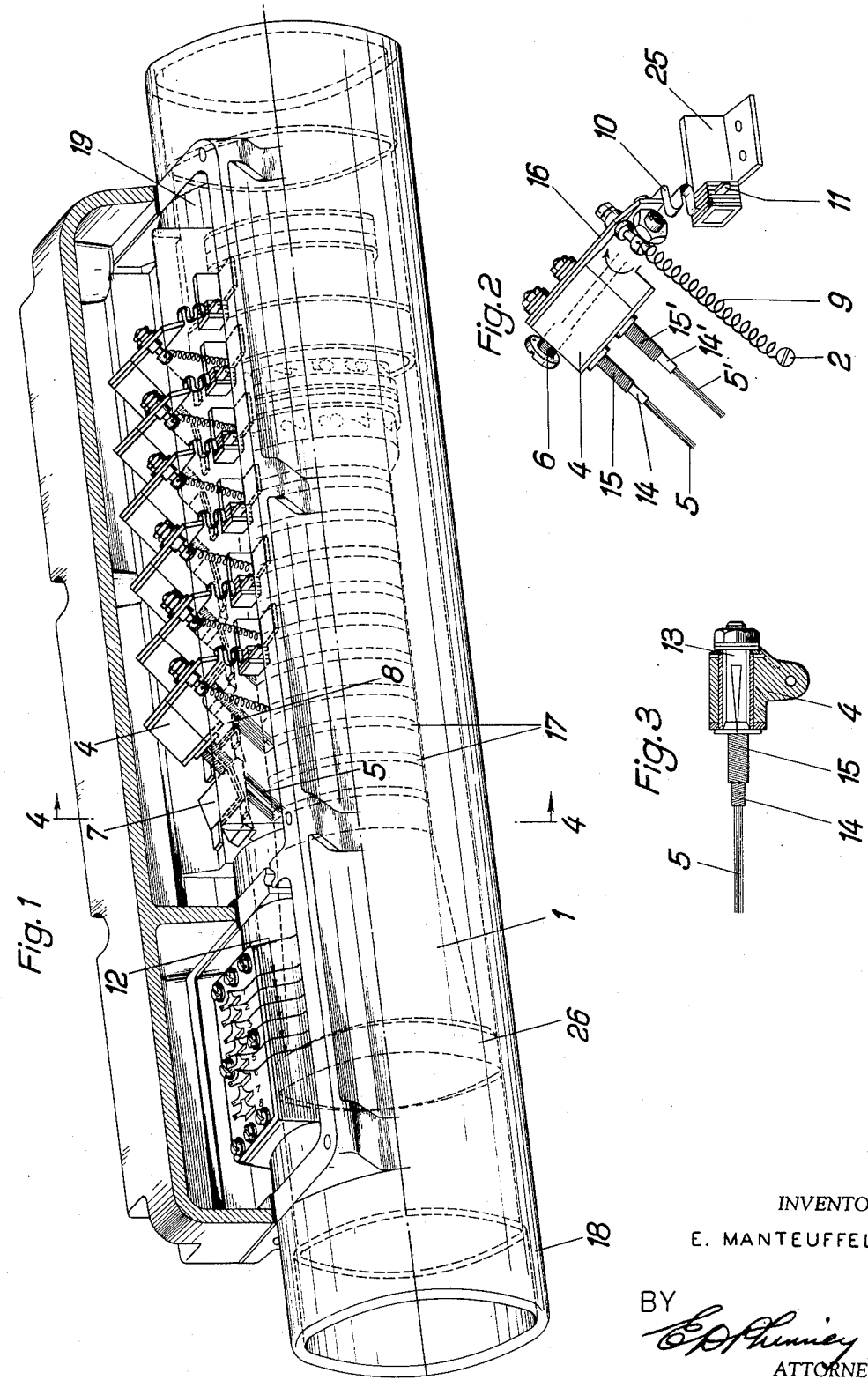
INVENTOR
E. MANTEUFFEL
BY
ATTORNEY Nov. 15, 1955 E. MANTEUFFEL 2,723,810
FACILITY FOR TRACING THE ROUTING-ADJUSTMENT
RINGS ON PNEUMATIC-TUBE DISPATCH CARRIERS
Filed July 31, 1952 2 Sheets-Sheet 2

INVENTOR.
ERNST MANTEUFFEL
BY
ATTORNEY

United States Patent Office 2,723,810
Patented Nov. 15, 1955

---

2,723,810

FACILITY FOR TRACING THE ROUTING-ADJUSTMENT RINGS ON PNEUMATIC-TUBE DISPATCH CARRIERS

Ernst Manteuffel, Berlin-Karlshorst, Germany, assignor to International Standard Electric Corporation, New York, N. Y., a corporation of Delaware Application July 31, 1952, Serial No. 302,017

Claims priority, application Germany August 1, 1951

5 Claims. (Cl. 243—16)

This invention relates to pneumatic tube dispatching systems and more particularly it relates to routing contact control for the carriers in such systems.

Pneumatic tube systems are known wherein the carriers which are to be dispatched through the pneumatic tubes, carry contact members such as combinations of contact rings around the carriers which rings cooperate with localized testing or checking contacts to determine, for example, over what particular route the carrier shall proceed to a receiving station. In general, the route testing can be effected either by bringing the carrier to a temporary halt at the testing point or the testing can take place while the carrier is moving past the testing point.

It is known to have contact brushes project into the tube track for the purpose of route control during travel. It has turned out, however, particularly with large carriers, that contact-making is not always satisfactory. Usually each carrier has at its front end a felt head which is of larger outside diameter than the main body of the carrier. Consequently, when the carrier arrives at a route checking, the contact brushes must accommodate themselves to a certain height of lift defined by the difference between the diameter of the front felt-head and that of the contact rings. The carrier itself, hitting the contact brushes with a velocity of up to 18 m./sec., causes them to undergo springing and swinging or vibratory motions so that a satisfactory contact engagement is no longer possible. This usual arrangement, furthermore, involves excessive wear of the contact material.

The invention provides an improved organization of apparatus for checking or testing the contact rings of travelling pneumatic dispatch carriers particularly those carriers which have peripheral regions of pronounced diameter differences which would normally cause the testing contact brushes to be lifted excessively. The invention provides a more positive contact-making arrangement and one which is free from excessive wear. To this end the invention provides for limiting the deflection which the contact brushes or tracing devices undergo when struck by one of the carriers. In this way brush rebounding and vibrations will be prevented.

Figure 5:
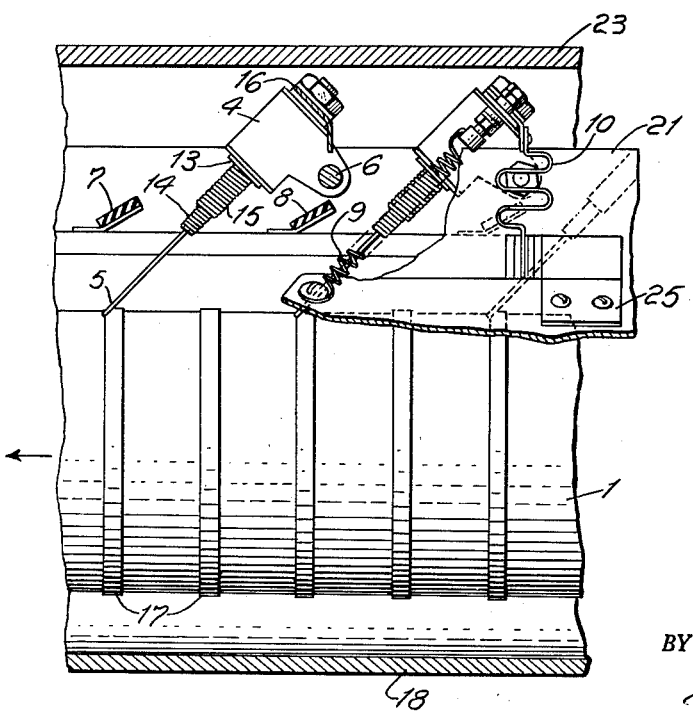

The invention will be understood from the following description and be particularly pointed out in the appended claims, reference being had to the accompanying drawings in which one embodiment of the invention is represented. In this drawing:

Fig. 1 is a partially sectioned view of a tube-track section equipped with a tracing arrangement constructed as provided by the invention. Fig. 2 is a detail view of one of the contact devices forming part of this tracing arrangement. Fig. 3 is a sectional view of this contact device. Fig. 4 is a transverse sectional view of the arrangement of Fig. 1, taken along the line 4—4 thereof. Fig. 5 is a fragmentary sectional view of Fig. 4, taken along the line 5—5 thereof.

In the drawing, the numeral 1 represents a typical carrier which, for example, carries around the main body portion thereof a series of contact rings 17. The particular carrier shown in the drawing has a set of nine contact rings designated 17. It will be understood, of course, that a greater or less number of such rings may be provided on each carrier, the number and location of which are used to identify the particular route that the carrier is to traverse through the tube system, a section 18 of which is shown in the drawing. As shown more clearly in Fig. 4, the tube 18 at its upper portion is provided with an elongated slot 19 through which project the route checking or contact testing brushes 5, 5'. These brushes are arranged in pairs so that two such brushes are adapted to engage simultaneously a contact ring 17 as the carrier 1 is passing by the checking position. The pairs of brushes 5, 5' are each supported in a holder 4 of suitable insulating material. Each of these holders is pivotally mounted for rocking movement on a shaft 6 which is supported in a pair of parallel vertically extending flanges 20, 21, forming integral extensions from the tube 18. The tube 18 may also be provided with an integral trough portion 22 which is arranged to have a cover member 23 bolted thereto with a suitable intervening air-tight gasket 24. This preserves the air-tight condition of the interior of the tube while providing a mounting space or trough for the various pairs of contact members.

As shown more clearly in Fig. 5, each of the contact members or testing brushes is in the form of a bundle of fine wires 5 which are bound together at their upper positions by two helically wrapped springs 14, 15, which springs are wound in mutually opposite directions and provide a solid end portion which can be gripped in respective clamping chucks 13 carried by the insulated block 4. Thus, the remaining half of the length of the wire bundles 5 are highly flexible and extend downwardly in an inclined manner through the slot 19 so as to engage the contact rings 17. The carrier is arranged to move through the tube in the direction of the arrow (Fig. 5). The two brushes in each pair in each insulating block are electrically connected through a contact bar 16 and this contact bar in turn is connected through a zig-zag flexible leaf spring 10, for example of bronze and thence to an individual soldering lug 11. Each lug 11 is insulatingly mounted on a channel member 25 which can be bolted to the exterior face of tube 18 as shown in Fig. 4. Thus, individual electric connections can be made from the respective lugs 11 to a distributor device 12, while at the same time each pair of brushes 5 is capable of pivotal motion around the axis 6. Each of the brush assemblies is provided with a tensioned helical spring 9, one end of which is fastened to its brush assembly and the other end of which is fastened to the tube 18, thus tending to hold the brush pairs downwardly in an inclined position as shown in Fig. 5. The spring 18 is insulated from member 16 by any suitable arrangement of insulation washers or the like.

For the purpose of limiting the upward deflection of each brush pair and for the purpose of limiting the downward deflection, there is mounted across the flanges 20, 21 a series of resilient stop plates 7 and 8. These plates are located between successive brush assemblies so that each plate acts to limit the upward deflection of each brush pair and also the downward deflection thereof. Since the plates 7 are of resilient material, when the enlarged felt head 26 of the carrier strikes a pair of brushes, the said brushes are deflected clockwise as seen in Fig. 5 and are stopped by the resilient engagement with the respective resilient plate 7. This also prevents excessive rebounding and vibration of the brushes after they leave the enlarged carrier head and engage the contact rings 17, and the resilient stop plates tend to dampen the vibration of each brush assembly after the brushes leave the enlarged end of the carrier.

Thus, when a dispatch carrier 11 travels past the route checking or testing position shown in Fig. 1 each brush assembly is lifted by engagement with the enlarged front felt head of the carrier over which it wipes. The upward deflection of the brushes 5, 5' is limited by their engagement with the resilient vibration damping plates 7. Immediately thereafter, the said brushes are urged by their respective springs 9 into contact-making engagement with the body of the carrier, and they can engage the successive contact rings without gliding thereof sideways.

By the foregoing described arrangement, the contact brushes 5, 5' of each pair, can be connected in circuit by a selectively permanent connection by means of the respective soldering lugs 11 and the zig-zag or meandering leaf spring 10 and thence to a suitable connection distributor 12, avoiding the necessity of using relatively fragile flexible connecting wires. In this way, the likelihood of connection wire breakage is reduced to the greatest extent.

When a dispatch carrier 1 travels through the tracing arrangement, the tracing devices 4, 5, 5' are first lifted through the front felt head of the carrier and then wipe over it coming, however, immediately in contact-making touch with the carrier body. Since, moreover, the two contact brushes 5, 5' are elastic, they can join a contact ring without gliding off sideways.

From the contact brushes 5, 5' a rigid electric connection can be established over the meander-shaped spring 10 and the soldering terminal 11 to a connection distributor 12, without making use of flexible wires. In this way the trouble susceptibility that would be involved with wire breakages is to the greatest extent eliminated.

What is claimed is:

1. A contacting arrangement for pneumatic tube systems of the kind employing discharge carriers carrying peripheral route-identifying contact elements, comprising pivotally mounted contacting brush units arranged to engage said contact elements for controlling the routing of the carrier through a pneumatic tube, each brush unit comprising a frame pivotally supported on said tube and in which at least one brush is mounted so as to extend through an opening in the wall of said tube into engagement with said contact elements, and a stop member affixed to said tube for each brush unit for limiting the pivotal deflection thereof when struck by a moving carrier, said stop member having a resilient surface to limit the rebounding and vibration of the brush as it successively engages portions of the carrier of different radial extent.

2. A contacting arrangement according to claim 1 in which each brush assembly includes a pair of contact brushes each constituted of a bundle of wires bound together adjacent one end by two helical springs, said springs being wound in opposite directions, one of said springs peripherally surrounding the other, and said bound end of said brushes removably fastened in a brush holding device.

3. A contacting arrangement according to claim 2 in which said brush clamping device comprises a chuck for the bound ends of said brushes.

4. A contacting arrangement according to claim 1 in which said pneumatic tube has an elongated slot in one wall through which the brush in each brush unit extends interiorly of the tube, said tube also having a pair of integral flanges with a removable air-tight cover defining a trough external of the tube for enclosing said brush units, and in which said brush units are pivotally mounted, a plurality of soldering terminals fixedly mounted within said trough, and zig-zag leaf spring members one for each of said brush units having one end connected to a brush unit and the opposite end connected to a corresponding one of said soldering terminals.

5. A contacting arrangement according to claim 1 in which each brush unit is provided with a tensioned helical spring tending to urge the brushes of the associated unit into contact with said carrier.

References Cited in the file of this patent

UNITED STATES PATENTS

| 2,085,265 | Mauch et al. | June 27, 1937 |

FOREIGN PATENTS

| 548,450 | Germany | Apr. 12, 1932 |
| 577,420 | Germany | May 31, 1933 |
| 688,546 | Germany | Feb. 23, 1940 |
| 699,172 | Germany | Nov. 23, 1940 |